United States Patent [19]
Imazeki et al.

[11] 4,456,864
[45] Jun. 26, 1984

[54] CLAMPING TRACER CONTROL SYSTEM

[75] Inventors: Ryoji Imazeki; Etsuo Yamazaki; Takao Sasaki, all of Hachioji, Japan

[73] Assignee: Fanuc Ltd., Tokyo, Japan

[21] Appl. No.: 327,475

[22] Filed: Dec. 4, 1981

Related U.S. Application Data

[63] Continuation of Ser. No. 118,980, Feb. 6, 1980, abandoned.

[51] Int. Cl.³ .............................................. H02P 5/06
[52] U.S. Cl. ................................................... 318/578
[58] Field of Search ................ 318/578, 579, 603, 604

[56] References Cited
U.S. PATENT DOCUMENTS 3,174,089 3/1965 Hawkins et al. .................... 318/579
4,157,679 6/1979 Wenzel ........................... 318/578 X Primary Examiner—G. Z. Rubinson
Assistant Examiner—Richard M. Moose
Attorney, Agent, or Firm—Staas & Halsey

[57] ABSTRACT

A clamping tracer control system which performs a tracing feed and a pick feed alternately and effects a clamping feed at a preset clamp level and in which, between the pick feed position where the clamping feed is carried out first and the pick feed position where the clamping feed has been completed, tracer control is repeated while changing the clamp level sequentially, and when the clamping feed has been completed in the repeated tracer control, the clamp level is restored to its area of initial value to resume tracer control of the tracing feed and the pick feed alternately in the next area.

4 Claims, 5 Drawing Figures

CLAMPING TRACER CONTROL SYSTEM

This is a continuation of application Ser. No. 118,980 filed Feb. 6, 1980, now abandoned.

BACKGROUND OF THE INVENTION

1. Field of the Invention

This invention relates to a clamping tracer control system which permits efficient profile working of a workpiece.

2. Description of the Prior Art

It is the general practice in conventional profile working to set up a clamp level and carry out tracing until the tracer head tracing the model surface reaches the clamp level, and then perform a clamping feed, so as to prevent excessive working of a workpiece. In this case, upon each completion of tracing in the clamp tracing area, the clamp level is changed, and the working is completed by conducting such tracing operation a plurality of times.

In such conventional profile working, when repeated clamping feed is required at a plurality of places within the tracing area, repeated profile working takes place at other places, too, resulting in a waste of time.

SUMMARY OF THE INVENTION

Accordingly, it is a primary object of the present invention to provide a clamping tracer control system which is designed to perform repeated profile working only at each clamp tracing area while sequentially changing the clamp level, thereby to ensure efficient profile working.

Briefly stated, according to the present invention, in a clamping tracer control system which temporarily stops tracing and effects a clamping feed when the tracer head tracing the model surface has reached a clamp level, tracer control is repeatedly performed between the position of pick feed axis where the clamping feed is carried out first and the position of pick feed axis were the clamping feed as been completed during the tracing feed, with the clamp level changed in a sequential order, and when the clamping level comes to an end, it is restored to its initial value to permit tracing to proceed to the next area of the model surface.

DESCRIPTION OF THE PREFERRED EMBODIMENTS

Figure 1:
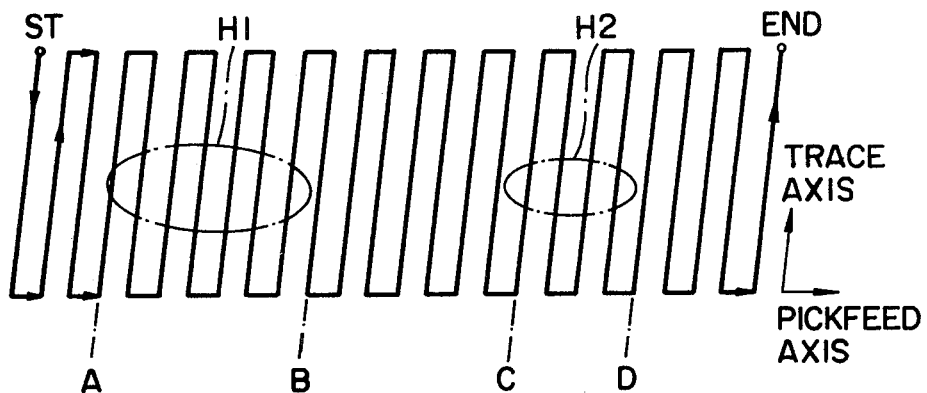
FIG. 1 is explanatory of a tracing path.

As shown in FIG. 1, in the case where a tracing path is determined to start at a point ST and end at a point END and the tracing path includes clamping feed areas H1 and H2, a tracer head starting from the point ST in fed along the tracing path by successively repeating a tracing feed and a pick feed in the direction of arrows; but in the tracing path at a point A, when the mechanical position of the tracer head becomes lower than the clamp level, the clamping feed takes place. The position of pick feed axis where the clamping feed is carried out first, is stored as the point A in a memory. Thereafter, when the tracer head has been brought to a point B by the subsequent tracing feed, clamping feed and pick feed, the mechanical position of the tracer head does not become lower than the clamp level during the tracing feed, so that no clamping feed takes place, and this position of pick feed axis is also stored as the point B in the memory. By reversing the direction of pick feed at the point B and changing the clamp level, tracing is effected toward the point A. When tracing has returned to the point A, the reversal of the direction of pick feed and the change of the clamp level are carried out and tracing is effected toward the point B; in this way, tracing is performed repeatedly between the points A and B until no further clamping feed takes place or until the clamp level reaches to the end level.

Figure 2:
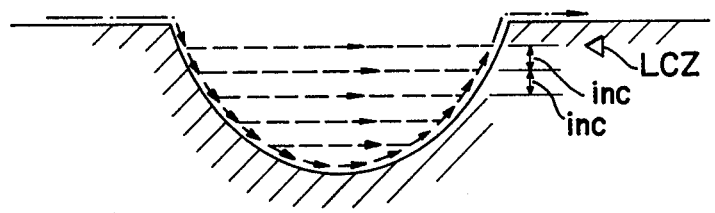
FIG. 2 is explanatory of a clamp level.

FIG. 2 is an explanatory cross-sectional view taken along the direction of tracing feed. With respect to its initial value, the clamp level LCZ is varied by an increment inc for the next subsequent tracing feed, and the clamping feed is performed at the new clamp level.

After tracing has been repeated between the points A and B until the clamping feed no longer occurs, the direction of pick feed is not reversed at the point B, and the clamp level is reset to its initial value, and tracing is effected toward a point C. Then, when the tracer head has reached the point C, the clamping feed is carried out again, so that the point C is stored. Similarly, a point D is stored where the clamping feed comes to an end; and profile working takes place repeatedly between the points C and D.

Accordingly, in the prior art, clamping tracer control is performed continuously n times between the start and end points ST and END, whereas in the present invention, the clamping tracer control is repeatedly carried out only between the points A and B and between the points C and D where the areas H1 and H2 exist respectively, and the tracer control is performed only once between the start point ST and the point A, between the point B to C and between the point D to the end point END.

Figure 3:
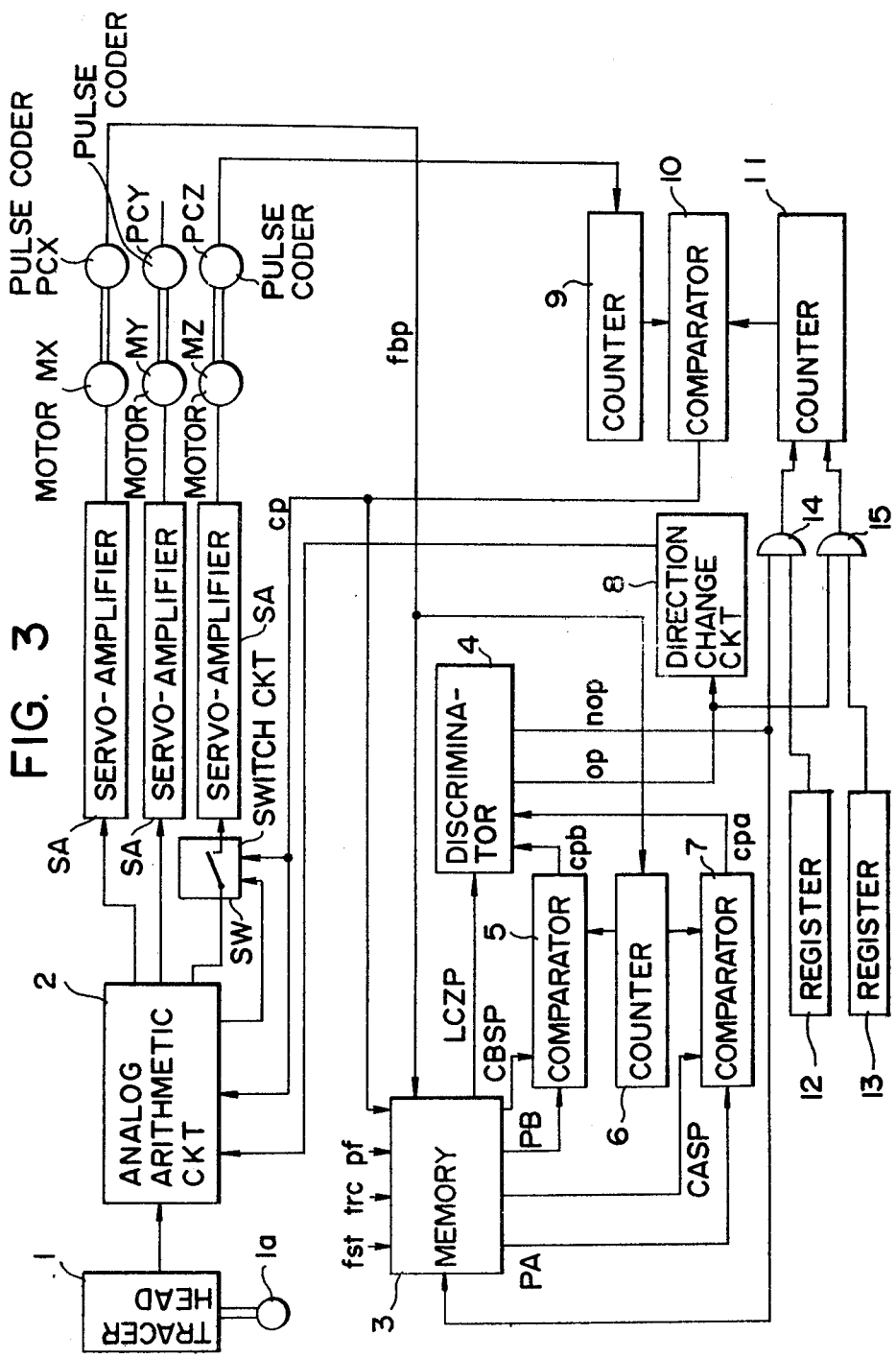
FIG. 3 is a block diagram illustrating an embodiment of the present invention.

FIG. 3 is a block diagram of an embodiment of this invention, illustrating the principal elements for effecting the abovesaid clamping tracer control. In FIG. 3, reference numeral 1 indicates a tracer head equipped with a stylus 1a making contact with the model surface; 2 designates an analog arithmetic circuit; 3 identifies a memory; 4 denotes a discriminator; 5, 7 and 10 represent comparators; 6 shows a current position counter; 8 refers to a direction change circuit; 9 indicates a Z-axis current position counter; 11 designates a clamp level set counter; 13 identifies a register for setting an increment of the clamp level; 14 and 15 denote AND circuits; reference character SW represents a switching circuit; SA shows servo-amplifiers; MX, MY and MZ refer to motors; and PCX, PCY and PCZ indicate position detectors, for example, resolvers or pulse coders. In the following, the position detectors PCX, PCY and PCZ will be described to be pulse coders, which are respectively coupled with the motors MX, MY and MZ.

The motors MX, MY and MZ are provided for driving a pick feed axis, a tracing axis and the Z-axis, respectively. The switching circuit SW is turned OFF by a clamping feed signal cp to stop driving of the motor MZ, permitting the clamping feed to take place; and the switching circuit SW is turned ON by a displacement signal from the tracer head 1.

Figure 4:
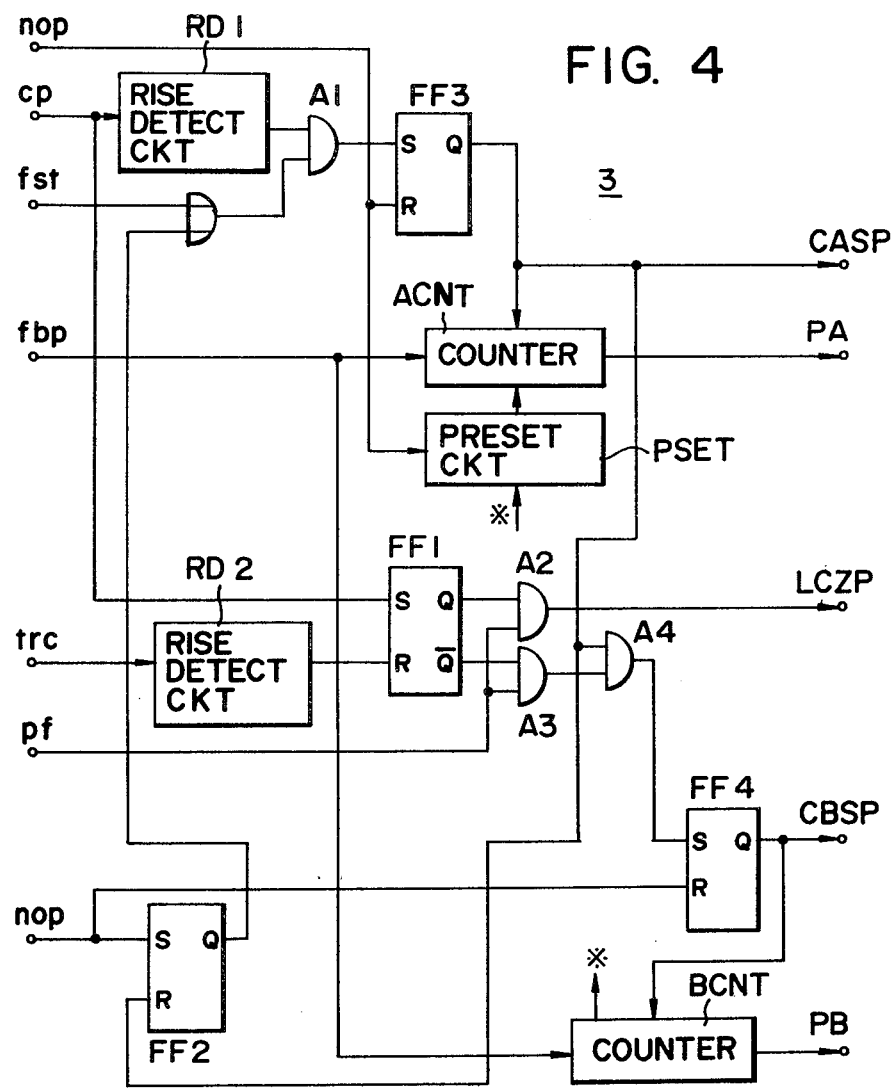
FIG. 4 is a block diagram illustrating an example of a memory for use in this invention.

The memory 3 receives a clamping feed signal cp, a pick feed signal pf, a tracing feed signal trc, a first-tracing signal fst, a clamping-feed-non-operation discriminated signal nop from the discriminator 4, and feedback pulses fbp of the pick feed axis from the pulse coder PCX, and outputs a position-A signal PA, a position-B signal PB, a singal CASP to set the position-A signal PA in a position-A counter, a signal CBSP to set the position-B signal PB in a position-B counter and a clamping feed operation signal LCZP. FIG. 4 shows in block form the principal part of the memory 3. In FIG. 4, reference characters FF1 to FF4 indicate flip-flops; RD1 and RD2 designate rise detect circuits; A1 to A4 identify AND circuits; ACNT and BCNT denote position-A and position-B counters respectively; and PSET represents a preset circuit. When the flip-flop FF3 outputs "1" at its terminal Q, the position-A counter ACNT stops counting the feedback pulses fbp and outputs the position-A signal PA, and when the flip-flop FF4 outputs "1" at its terminal Q, the position-B counter BCNT stops counting the feedback pulses fbp and outputs the position-B signal PB. When the clamping feed is performed, the flip-flop FF1 is set by the clamping feed signal cp, and by the next pick feed signal pf, the clamping feed operation signal LCZP is made "1".

Figure 5:
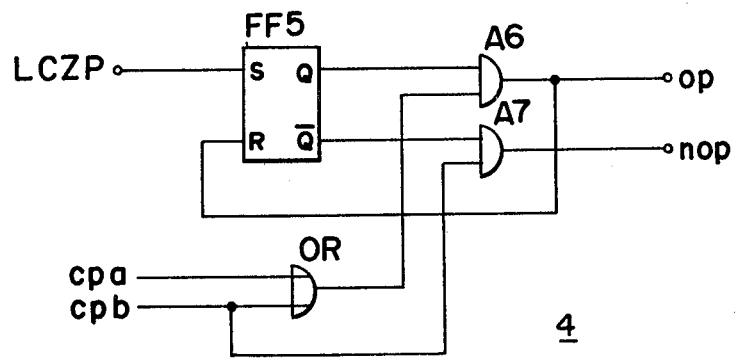
FIG. 5 is a block diagram showing an example of a discriminator for use in this invention.

The discriminator 4 comprises a flip-flop FF5, AND circuits A6 and A7, and an OR circuit OR, as depicted in FIG. 5. The flip-flop FF5 is set by the clamping feed operation signal LCZP. A clamping feed operation discriminated signal op, corresponding to whether the flip-flop FF5 has been set, or the clamping-feed-non-operation discriminated signal nop, is derived from the AND circuit A6 or A7 when a coincidence signal cpa or cpb is applied thereto from the comparator 5. The flip-flop FF5 is reset when the clamping feed operation discriminated signal op is provided.

When starting the tracing operation from the start point ST of the tracing path shown in FIG. 1, an initial value of the clamp level is set in the clamp level set counter 11 by a non-iilustrated arrangement from the register 12 in which has been set the initial value of the clamp level, and the switching circuit SW remains in the ON state due to the fact that the clamping feed signal cp is "0". The first-tracing signal fst is provided to the memory 3, and, by the output from the analog arithmetic circuit 2, the motor MY is driven to perform the tracing feed.

The stylus 1a makes contact with a model (not shown), and a displacement signal varying with the model configuration along the tracing path is supplied from the tracer head 1 to the analog arithmetic circuit 2, to drive the motor MZ in accordance with the displacement signal. The pulse coder PCZ coupled with the motor MZ applies pulses to the Z-axis current position counter 9, whose count content represents the current position of the Z-axis.

When the tracing proceeds to the pick feed position, driving of the motor MY is stopped and the motor MX is driven to achieve the pick feed. Pulses from the pulse coder PCX coupled with the motor MX are provided as the feedback pulses fbp to the memory 3 and the curent position counter 6, and the count content of the current position counter 6 is applied to the comparators 5 and 7. In the memory 3, the feedback pulses fbp are provided to the position-A and position-B counters ACNT and BCNT. Accordingly, the count contents of the position-A and position-B counters ACNT and BCNT represent the position of the pick feed axis.

When the tracing feed and the pick feed have been repeated alternately to reach the point A in FIG. 1, the mechanical position of the stylus 1a becomes lower than the clamp level during tracing. That is, the count content of the Z-axis current position counter 9 and the initial value of the clamp level set in the clamp level set counter 11 coincide with each other, outputting the clamping feed signal cp from the comparator 10. By the clamping feed signal cp the switching circuit SW is turned OFF to stop driving the motor MZ and perform the clamping feed.

The clamping feed signal cp is also provided to the memory 3, wherein its rise from "0" to "1" is detected by the rise detect circuit RD1, setting the flip-flop FF3 via the AND circuit A1. Further, the flip-flop FF1 is set by the clamping feed signal cp. The flip-flop FF1 is reset by the detection of the rise of the tracing feed signal trc from "0" to "1" by the rise detect circuit RD2.

Upon setting of the flip-flop FF3 to provide an output "1" at its terminal Q, the signal CASP is outputted, and the position-A counter ACNT stops counting the feedback pulses fbp to store and hold the position A, while the flip-flop FF2 is reset.

Upon application of the next pick feed signal pf, the AND circuits A2 and A3 are opened, and if the flip-flop FF1 is set, the clamping feed operation signal LCZP is outputted to set the flip-flop FF5 of the discriminator 4.

When the clamping feed and the pick feed have been repeated alternately during the tracing feed to reach the point B in FIG. 1, then, when no clamping feed has been carried out during the latest feed, the flip-flop FF1 remains reset, and by the next pick feed signal pf the flip-flop FF4 is set via the AND circuits A3 and A4 to provide the signal CBSP and a counting stop signal for the position-B counter BCNT. As a consequence, the position-B counter BCNT stops counting the feedback fbp, to store and hold the position B, and applies the position-B signal PB to the comparator 5. At this moment, the count contents of the current position counter 6 and the position-B counter BCNT are the same, so that the coincidence signal cpb is provided to the discriminator 4. Since the flip-flop FF5 is held in its set state, the clamping feed operation discriminated signal op is outputted. The signal op is fed to the direction change circuit 8 to cause it to apply a pick feed direction change signal to the analog arithmetic circuit 2, reversing the direction of pick feed by the motor MX. Further, the AND circuit 15 is opened, through which an increment from the register 13 is added to the initial value of the clamp level set counter 11.

When tracing has reached the point A from the point B, the content of the point-A counter ACNT and the content of the current position counter 6 coincide with each other, so that the coincidence signal cpa is provided from the comparator 7 to the discriminator 4. The discriminator 4 applies the clamping feed operation discriminated signal op to the direction change circuit 8, which provides a pick feed direction change signal to the analog arithmetic circuit 2 to reverse the direction of pick feed, and the flip-flop FF5 is reset by the output op of the discriminator 4. Further, the content of the register 13 is added to the counter 11 to set a new clamp level.

By the repetition of such an operation as described above, tracing is performed between the points A and B; and when the clamping feed during tracing between points A and B has been completed the flip-flop FF5 is in the reset state when tracing has reached the point B, and the coincidence signal cpb is supplied from the comparator 5 to the discriminator 4 to derive therefrom the clamping-feed-non-operation discriminated signal nop. By this signal nop the AND circuit 14 is opened, through which the initial value of the clamp level stored in the register 12 is set in the clamp level set counter 11. The clamping-feed-non-operation discriminated signal nop is also applied to the memory 3 to set the flip-flop FF2 and to preset the circuit PSET, and the content of the position-B counter BCNT is preset in the through the preset circuit PSET (as indicated by the symbols ✳ in FIG. 4). As a consequence, the position-A and position-B counters ACNT and BCNT and the current position counter 6 become equal in content to each other, and the feedback pulses fbp generated by the pick feed are counted.

When tracing has reached the point C in FIG. 1, the point C where the clamping feed was performed is stored in the counter ACNT as was the case with the point A, and the point D is also stoed in the counter BCNT as was the case with the point B; and tracing is carried out repeatedly between the points C and D. The clamp level is changed incrementally, and when the clamping feed has been completed, tracing continues from the point D to the end point END, where the tracer control is completed.

The position-A and position-B counters ACNT and BCNT may also be formed by other storage means, for example, semiconductor memories to store the position where the clamping feed is performed first and the position where the clamping feed is not required to complete the tracing of the respective area of the model.

As has been described in the foregoing, the clamping tracer control system of the present invention is provided with first and second memory means, such as the position-A and the position-B counters ACNT and BCNT, and by the clamp level set means, such as the clamp level set counter 11. Between the position where the clamping feed is perfomed first, for example the point A, and the position where the clamping feed is no longer required, for example the point B, tracing is repeated with the clamp level changed for each tracing. When the clamping feed is finished, the clamp level is reset to its initial value to permit tracing to proceed to the next area. In areas where the initial value of the clamp level is not reached tracing takes place only once, and, only in those areas where the clamping feed is performed, tracing is repeated until the changed clamp level is not reached. Thus, the present invention ensures reduced waste in tracing and hence provides for enhanced efficiency in profile working.

It will be apparent that many modifications and variations may be effected without departing from the scope of the novel concepts of this invention.

What is claimed is:

1. In a control system for controlling the tracing operation of a tracer head over a predetermined portion of the surface of a model, said tracing operation proceeding by alternately feeding said tracer head along respective pick and tracing feed axes to pass between respective starting and end points corresponding to said model surface portion, said tracing operation being limited along a respective clamp feed axis to a successively incremented clamp limit until a predetermined final clamp position is attained or until the clamp limit does not occur, the improvement comprising detection means (1) for detecting each position on the pick feed axis where a first clamp limit is reached during a respective tracing feed, and (2) for detecting the subsequent position on the pick feed axis, after each said reaching of the first clamp limit, where said clamp limit first does not occur during a subsequent tracing feed, repetition means for repeatedly moving back and forth between said two detected positions, prior to continuing said tracing operation between said start and end points, at successively incremented clamp limits until the respectively incremented clamp limit does not occur or a predetermined maximum clamp limit is obtained, and for subsequently continuing with said tracing operation between said start and end points of said tracing operation at said first clamp limit, wherein said tracing operation involves only a single tracing between said start and end points at said first clamp limit and the repeated moving between each respective pair of said detected positions on the feed axis at said incremented clamp limits.

2. The control system of claim 1, said detection means comprising a memory having as inputs (1) a clamp limit signal op, produced during a respective feed along said tracing axis, to indicate when the respective clamp limit has been reached and that said repeated moving is to begin or is not completed, (2) a pick feed signal pf to indicate when said tracer head is to be fed along said pick feed axis, (3) a non-repetition signal nop for indicating that said repeated moving is completed between the respective paid of detected points, (4) a signal fbp corresponding to the change in position of the tracer head along said pick feed axis, and (5) a tracing feed signal trc for indicating that said tracer head is to be fed along said tracing feed axis, and having as outputs (1) the values of each said pair of detected positions, and (2) a signal LCZP that indicates the respective clamp limit was reached during the last tracing feed, and said repetition means comprising a discriminator having as inputs (1) said LCZP signal and (2) inputs indicating when the respective one of each of said pair of detected positions is reached during each said repeated moving therebetween, and as outputs (1) said signal op, and (2) said signal nop, a direction change circuit having as input said signal op, and a means for providing said first clamp limit and each said respectively incremented clamp limit corresponding to each said repeated moving between each said pair of detected points, and for providing again said first clamp limit after completing each said repeated moving.

3. The system of claim 2, said memory comprising a first flip-flop FF1 that is set by said cp signal, that is reset by said trc signal, and the Q output of which is ANDed with said pf signal to produce said LCZP output, a second flip-flop FF2 which is set by said nop signal, reset by a signal indicating the detection of each said feed axis position where said first clamp limit is reached, and which supplies its Q output to an OR gate, a third flip-flop FF3 which is set by the output of an AND gate having as inputs the output of said OR gate and a signal corresponding to said cp signal, which is reset by said nop signal, and which supplies as its Q output a signal for storing the current pick feed axis position as said first detected point, a fourth flip-flop FF4 which is set by the output of an AND gate A4 which has as inputs said Q output of FF3 and the output of an AND gate A3 having as inputs of $\overline{Q}$ output of FF1 and said pf signal, a counter ACNT having as inputs said Q output of FF3 and said fbp signal, wherein the value of the first of each said pair of detected points along said pick feed axis is consecutively stored, a counter BCNT having as inputs said fbp signal and the Q output of FF4, wherein the value of the second of each said pair of detected points along said pick feed axis is consecutively stored, and a preset circuit PSET having as inputs said nop signal and an output of said counter BCNT, wherein the value in said counter BCNT is placed into said ACNT counter at the conclusion of said repeated moving between each said pair of detected positions.

4. The control system of claim 2 or 3, said repetition means comprising means for comparing the positions stored in said counters ACNT and BCNT with said fbp signal for producing respective signals cpa and cpb when the current position on the pick feed axis is the same as the respective stored detected position, and said discriminator comprising a flip-flop FF5 which is set by said LCZP signal, whose Q output is ANDed with the output of an OR gate having said cpa and cpb signals as inputs to produce said op signal, whose $\overline{Q}$ output is ANDed with said cpb signal to produce said nop signal, and FF5 being reset by said op signal.

* * * * *

UNITED STATES PATENT AND TRADEMARK OFFICE
CERTIFICATE OF CORRECTION

PATENT NO. : 4,456,864
DATED : June 26, 1984
INVENTOR(S) : RYOJI IMAZEKI et al

It is certified that error appears in the above-identified patent and that said Letters Patent is hereby corrected as shown below:

First page [57] ABSTRACT,
        line 8, after "the" (second occurrence) insert --area of--;
        line 10, delete "area of".

Column 1, line 40, "were" should be --where--;
        line 41, "as" should be --has--;
        line 62, "in" should be --is--.

Column 3, line 7, "singal" should be --signal--;
        line 42, "non-iilustrated" should be --non-illustrated--.

Column 4, line 34, "latest" should be --latest tracing--;
        line 39, "feedback" should be --feedback pulses--.

Column 5, line 13, delete "in the";
        line 23, "stoed" should be --stored--.

Signed and Sealed this

First Day of January 1985

[SEAL]

Attest:

GERALD J. MOSSINGHOFF

*Attesting Officer*     *Commissioner of Patents and Trademarks*